US012663569B2

(12) United States Patent
Li et al.

(10) Patent No.: US 12,663,569 B2
(45) Date of Patent: Jun. 23, 2026

(54) THIN-FILM INTERFERENCE FILTER COLOR COATINGS

(71) Applicant: Apple Inc., Cupertino, CA (US)

(72) Inventors: Shuang Li, Shanghai (CN); Brian S Tryon, Redwood City, CA (US); Jacob L Smith, Austin, TX (US); Naoto Matsuyuki, Kasugai (JP)

(73) Assignee: Apple Inc., Cupertino, CA (US)

( * ) Notice: Subject to any disclaimer, the term of this patent is extended or adjusted under 35 U.S.C. 154(b) by 291 days.

(21) Appl. No.: 18/505,906

(22) Filed: Nov. 9, 2023

(65) Prior Publication Data

US 2025/0052936 A1      Feb. 13, 2025

Related U.S. Application Data

(60) Provisional application No. 63/518,306, filed on Aug. 8, 2023.

(51) Int. Cl.
*G02B 5/28*      (2006.01)
*G04G 9/00*      (2006.01)

(52) U.S. Cl.
CPC ........... *G02B 5/285* (2013.01); *G04G 9/0064* (2013.01)

(58) Field of Classification Search
CPC ........ G02B 5/285; G02B 5/28; G04G 9/0064; G04G 9/00; H05K 5/0243; H05K 5/02; C09D 1/00; C09D 5/33; C09D 5/004
See application file for complete search history.

(56) References Cited

U.S. PATENT DOCUMENTS

| | | | |
|---|---|---|---|
| 9,482,798 B2 | 11/2016 | Lee et al. | |
| 11,364,708 B2 | 6/2022 | Malay | |
| 11,691,176 B2 | 7/2023 | Koch | |
| 2019/0161847 A1 | 5/2019 | Ready et al. | |
| 2021/0030134 A1* | 2/2021 | Kim | C03C 17/245 |
| 2021/0048565 A1* | 2/2021 | Tryon | H04M 1/0202 |
| 2021/0286112 A1* | 9/2021 | Tryon | G02B 5/286 |
| 2022/0066397 A1* | 3/2022 | Matlak | C23C 28/32 |
| 2022/0350062 A1 | 11/2022 | Bao et al. | |
| 2023/0012033 A1* | 1/2023 | Bourreau | G02B 5/285 |
| 2023/0244018 A1 | 8/2023 | Tryon et al. | |

FOREIGN PATENT DOCUMENTS

EP            2501660 B1      6/2017

OTHER PUBLICATIONS

U.S. Appl. No. 18/364,760, filed Aug. 3, 2023.

* cited by examiner

*Primary Examiner* — Balram T Parbadia
(74) *Attorney, Agent, or Firm* — Treyz Law Group, P.C.; Michael H. Lyons

(57) ABSTRACT

An electronic device may be provided with conductive structures such as conductive housing structures. A visible-light-reflecting coating may be formed on the conductive structures. The coating may have adhesion and transition layers and a thin-film interference filter on the adhesion and transition layers. The thin-film interference filter may be a four-layer interference filter stacked directly onto the adhesion and transition layers and having an uppermost SiCrN layer, a lowermost SiN layer, and interleaved SiH and SiN layers. If desired, an opaque coloring layer such as a Cr layer may be disposed between the interference filter and the adhesion and transition layers. The coating may exhibit a deep red or orange color that has a relatively uniform visual response even when the underlying conductive structures have a three-dimensional shape.

16 Claims, 9 Drawing Sheets

THIN-FILM INTERFERENCE FILTER COLOR COATINGS

This application claims the benefit of U.S. Provisional Patent Application No. 63/518,306, filed Aug. 8, 2023, which is hereby incorporated by reference herein in its entirety.

FIELD

This disclosure relates generally to coatings for electronic device structures and, more particularly, to visible-light-reflecting coatings for conductive electronic device structures.

BACKGROUND

Electronic devices such as cellular telephones, computers, watches, and other devices contain conductive structures such as conductive housing structures. The conductive structures are provided with a coating that reflects particular wavelengths of light so that the conductive components exhibit a desired visible color.

It can be challenging to provide coatings such as these with a desired color brightness. In addition, if care is not taken, the coatings may exhibit unsatisfactory optical performance across different operating environments and conductive structure geometries.

SUMMARY

An electronic device may include conductive structures such as conductive housing structures. A visible-light-reflecting coating may be formed on the conductive structures. The coating may have adhesion and transition layers and a multi-layer thin-film interference filter on the adhesion and transition layers. If desired, an opaque coloring layer such as a Cr layer or a TiN layer may be interposed between the thin-film interference filter and the adhesion and transition layers.

The multi-layer thin-film interference filter may exhibit a deep red, orange, or yellow color even when the underlying conductive structures have a three-dimensional shape. The number, composition, and thicknesses of the layers of the multi-layer thin-film interference filter and optionally the opaque coloring layer may be selected to configure the coating to exhibit the color. In a first example, the multi-layer thin-film interference filter may be a four-layer interference filter that includes an uppermost SiCrN layer and interleaved SiH and SiN layers stacked directly onto the adhesion and transition layers without an opaque coloring layer. In a second example, the coating may include an opaque coloring layer such as a Cr layer sandwiched between the four-layer interference filter and the adhesion and transition layers. In a third example, the multi-layer thin-film interference filter may be a four or six-layer interference filter with alternating SiC and SiCrCN layers.

An aspect of the disclosure provides an apparatus. The apparatus can include a conductive substrate. The apparatus can include a coating on the conductive substrate and having a color. The coating can include adhesion and transition layers. The coating can include a thin-film interference filter on the adhesion and transition layers, wherein the thin-film interference filter has a lowermost layer that contacts the adhesion and transition layers and an uppermost layer opposite the lowermost layer, the uppermost layer comprises SiCrN, and the lowermost layer comprises SiN.

An aspect of the disclosure provides an apparatus. The apparatus can include a conductive substrate. The apparatus can include a coating on the conductive substrate and having a color. The coating can include adhesion and transition layers. The coating can include an opaque layer on the adhesion and transition layers, the opaque layer comprising chromium. The coating can include a thin-film interference filter on the opaque layer, the thin-film interference filter having an uppermost layer comprising SiCrN and a lowermost layer comprising SiN.

An aspect of the disclosure provides an apparatus. The apparatus can include a conductive substrate. The apparatus can include a coating on the conductive substrate and having a color. The coating can include adhesion and transition layers. The coating can include a thin-film interference filter on the adhesion and transition layers, wherein the thin-film interference filter has a first SiC layer, a first SiCrCN layer on the first SiC layer, and a second SiC layer on the first SiCrCN layer, the first SiC layer forming a lowermost layer of the thin-film interference filter.

3 most SiCrCN layer, an SiC layer, an SiN layer, and an SiH or SiC layer in accordance with some embodiments.

Figures 10, 11:
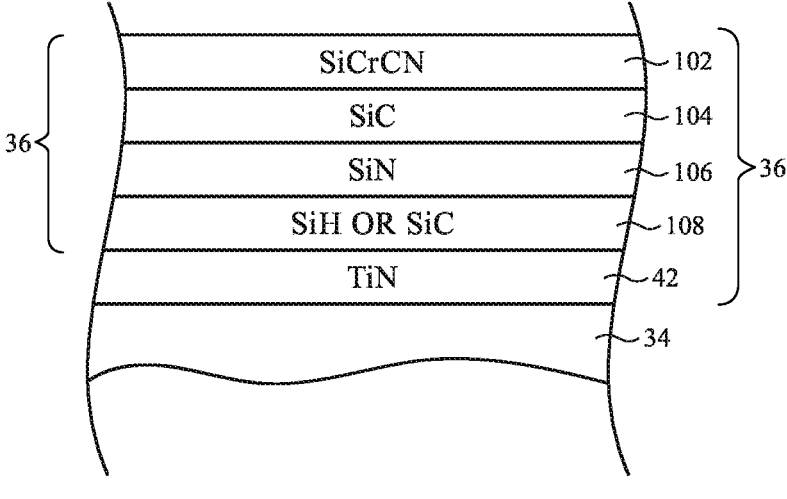
FIG. 10 is a cross-sectional side view of an illustrative visible-light-reflecting coating having a TiN opaque coloring layer and a four-layer interference film with an upper-

FIG. 11 is a cross-sectional side view of an illustrative visible-light-reflecting coating having a TiN opaque coloring layer and a three-layer interference film with an uppermost SiCrCN layer, an SiC layer, and a CrSiN or SiCrCN layer in accordance with some embodiments.

DETAILED DESCRIPTION

Electronic devices and other items may be provided with conductive structures. Coatings may be formed on the conductive structures to reflect particular wavelengths of visible light so that the conductive structures exhibit a desired color. A visible-light-reflecting coating may be deposited on a conductive substrate. The coating may include adhesion and transition layers on the substrate and a three-to-six-layer thin-film interference filter on the adhesion and transition layers. If desired, an opaque coloring layer such as a Cr layer or a TiN layer may be disposed between the interference filter and the adhesion and transition layers. In some implementations, the thin-film interference filter may have an uppermost SiCrN layer, a lowermost SiN layer, and interleaved SiN and SiH layers. In other implementations, the thin-film interference filter may include interleaved SiC and SiCrCN layers. The coating may exhibit a robust deep red, orange, or yellow color that exhibits a relatively uniform visual response even when the underlying conductive structures have a three-dimensional shape.

Figure 1:
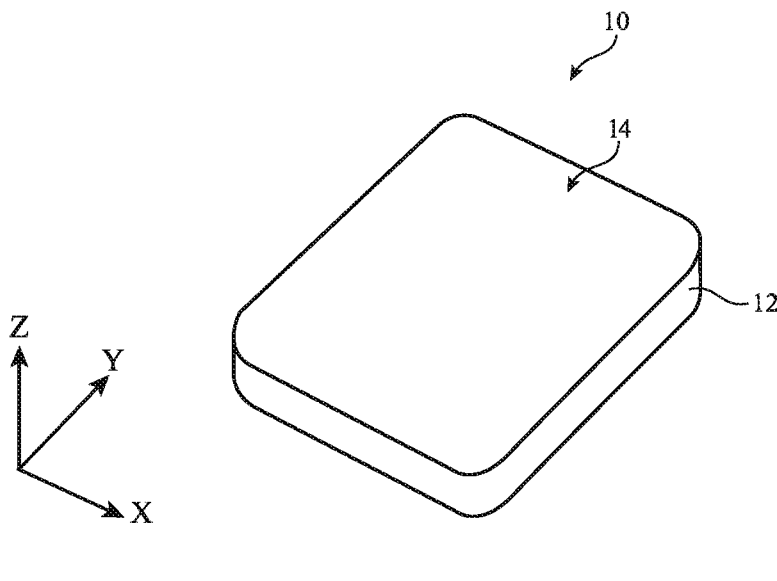
FIG. 1 is a perspective view of an illustrative electronic device of the type that may be provided with conductive structures and visible-light-reflecting coatings in accordance with some embodiments.

An illustrative electronic device of the type that may be provided with conductive structures and visible-light-reflecting coatings is shown in FIG. 1. Electronic device 10 of FIG. 1 may be a computing device such as a laptop computer, a computer monitor containing an embedded computer, a tablet computer, a cellular telephone, a media player, or other handheld or portable electronic device, a smaller device such as a wristwatch device (e.g., a watch with a wrist strap), a pendant device, a headphone or earpiece device, goggles, eyeglasses, or other equipment worn on a user's head (e.g., a head mounted display device), or other wearable or miniature device, a television, a computer display that does not contain an embedded computer, a gaming device, a navigation device, an embedded system such as a system in which electronic equipment with a display is mounted in a kiosk or automobile, a wireless base station, a home entertainment system, a wireless speaker device, a wireless access point, equipment that implements the functionality of two or more of these devices, or other electronic equipment. In the illustrative configuration of FIG. 1, device 10 is a portable device having a substantially rectangular lateral outline such as a cellular telephone or tablet computer. Other configurations may be used for device 10 if desired. The example of FIG. 1 is merely illustrative.

In the example of FIG. 1, device 10 includes a display such as display 14. Display 14 may be mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Housing 12 may have metal sidewalls or sidewalls formed from other materials. Examples of metal materials that may be used for forming housing 12 include stainless steel, aluminum, silver, gold, titanium, metal alloys, or any other desired conductive material.

Display 14 may be formed at (e.g., mounted on) the front side (face) of device 10. Housing 12 may have a rear housing wall on the rear side (face) of device 10 that opposes the front face of device 10. Conductive housing sidewalls in housing 12 may surround the periphery of device 10. The rear housing wall of housing 12 may be formed from conductive materials and/or dielectric materials.

The rear housing wall of housing 12 and/or display 14 may extend across some or all of the length (e.g., parallel to the X-axis of FIG. 1) and width (e.g., parallel to the Y-axis) of device 10. Conductive sidewalls of housing 12 may extend across some or all of the height of device 10 (e.g., parallel to Z-axis).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode (OLED) display pixels, an array of electrowetting display pixels, or display pixels based on other display technologies.

Display 14 may be protected using a display cover layer. The display cover layer may be formed from a transparent material such as glass, plastic, sapphire or other crystalline dielectric materials, ceramic, or other clear materials. The display cover layer may extend across substantially all of the length and width of device 10, for example.

Device 10 may include one or more buttons. The buttons may be formed from a conductive button member that is located within (e.g., protruding through) openings in housing 12 or openings in display 14 (as examples). Buttons may be rotary buttons, sliding buttons, buttons that are actuated by pressing on a movable button member, etc.

Figure 2:
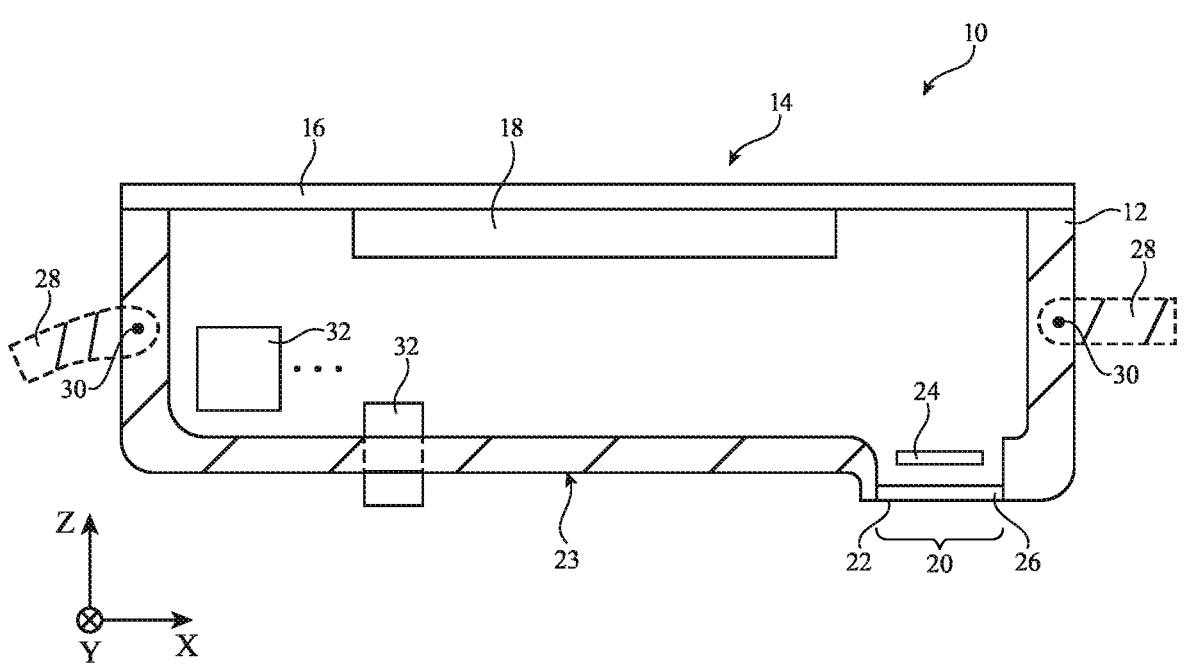
FIG. 2 is cross-sectional side view of an illustrative electronic device having conductive structures that may be provided with visible-light-reflecting coatings in accordance with some embodiments.

A cross-sectional side view of device 10 in an illustrative configuration in which display 14 has a display cover layer is shown in FIG. 2. As shown in FIG. 2, display 14 may have one or more display layers that form pixel array 18. During operation, pixel array 18 forms images for a user in an active area of display 14. Display 14 may also have inactive areas (e.g., areas along the border of pixel array 18) that are free of pixels and that do not produce images. Display cover layer 16 of FIG. 2 overlaps pixel array 18 in the active area and overlaps electrical components in device 10.

Display cover layer 16 may be formed from a transparent material such as glass, plastic, ceramic, or crystalline materials such as sapphire. Illustrative configurations in which a display cover layer and other transparent members in device 10 (e.g., windows for cameras and other light-based devices that are formed in openings in housing 12) are formed from a hard transparent crystalline material such as sapphire (sometimes referred to as corundum or crystalline aluminum oxide) may sometimes be described herein as an example. Sapphire makes a satisfactory material for display cover layers and windows due to its hardness (9 Mohs). In general, however, these transparent members may be formed from any suitable material.

Display cover layer 16 for display 14 may be planar or curved and may have a rectangular outline, a circular outline, or outlines of other shapes. If desired, openings may be formed in the display cover layer. For example, an opening may be formed in the display cover layer to accommodate a button, a speaker port, or other component. Openings may be formed in housing 12 to form communications or data ports (e.g., an audio jack port, a digital data port, a port for a subscriber identity module (SIM) card, etc.), to form openings for buttons, or to form audio ports (e.g., openings for speakers and/or microphones). If desired, display 14 may be mounted onto a conductive turret formed from housing 12 and separated from peripheral conductive sidewalls of housing 12 by a slot running around the periphery of device 10. The conductive turret and conductive structures in display 14 may form an antenna resonating element for device 10 (e.g., a patch antenna resonating element).

Device 10 may, if desired, be coupled to a strap such as strap 28 (e.g., in scenarios where device 10 is a wristwatch device). Strap 28 may be used to hold device 10 against a user's wrist (as an example). Strap 28 may sometimes be referred to herein as wrist strap 28. In the example of FIG. 2, wrist strap 28 is connected to attachment structures 30 in housing 12 at opposing sides of device 10. Attachment structures 30 may include lugs, pins, springs, clips, brackets, and/or other attachment mechanisms that configure housing 12 to receive wrist strap 28. Configurations that do not include straps may also be used for device 10.

Figure 3:
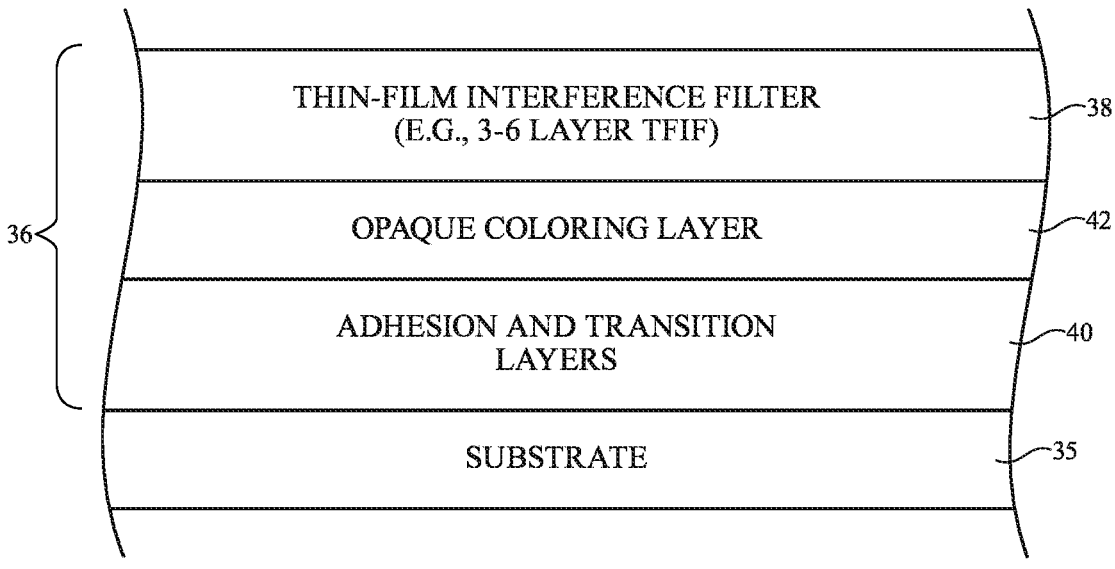
FIG. 3 is a cross-sectional side view of an illustrative visible-light-reflecting coating having a three-to-six-layer interference film in accordance with some embodiments.

If desired, light-based components such as light-based components 24 may be mounted in alignment with an opening 20 in housing 12. Opening 20 may be circular, may be rectangular, may have an oval shape, may have a triangular shape, may have other shapes with straight and/or curved edges, or may have other suitable shapes (outlines when viewed from above). Window member 26 may be mounted in window opening 20 of housing 12 so that window member 26 overlaps component 18. A gasket, bezel, adhesive, screws, or other fastening mechanisms may be used in attaching window member 26 to housing 12. Surface 22 of window member 26 may lie flush with exterior surface 23 of housing 12, may be recessed below exterior surface 23, or may, as shown in FIG. 3, be proud of exterior surface 23 (e.g., surface 22 may lie in a plane that protrudes away from surface 23 in the −Z direction). In other words, window member 26 may be mounted to a protruding portion of housing 12. Surface 23 may, for example, form the rear face of housing 12.

Conductive structures in device 10 may be provided with a visible-light-reflecting coating that reflects certain wavelengths of light so that the conductive structures exhibit a desired aesthetic appearance (e.g., a desired color, reflectivity, etc.). The conductive structures in device 10 may include, for example, conductive portions of housing 12 (e.g., conductive sidewalls for device 10, a conductive rear wall for device 10, a protruding portion of housing 12 used to mount window member 26, etc.), attachment structures 30, conductive portions of wrist strap 28, a conductive mesh, conductive components 32, and/or any other desired conductive structures on device 10. Conductive components 32 may include internal components (e.g., internal housing members, a conductive frame, a conductive chassis, a conductive support plate, conductive brackets, conductive clips, conductive springs, input-output components or devices, etc.), components that lie both at the interior and exterior of device 10 (e.g., a conductive SIM card tray or SIM card port, a data port, a microphone port, a speaker port, a conductive button member for a ringer button, power button, volume button, or other buttons, etc.), components that are mounted at the exterior of device 10 (e.g., conductive portions of strap 28 such as a clasp for strap 28), and/or any other desired conductive structures on device 10.

In practice, a visible-light-reflecting coating on conductive structures in device 10 may have different thicknesses across its (lateral) surface area due to changes in the underlying geometry of the conductive structure (e.g., because of coating deposition equipment limitations in depositing uniform coatings across the underlying geometry). For example, the coating may exhibit a first thickness at bottom and top edges of a conductive sidewall but may exhibit a second thickness along the center of the conductive sidewall, where the second thickness is greater than the first thickness and represents the maximum thickness of the coating across its surface area (e.g., 100% thickness). If care is not taken, variations in thickness along the surface area of coating 36 can undesirably alter the color of visible light reflected by the coating and thus the aesthetic appearance of the underlying conductive structure.

FIG. 3 is a cross-sectional diagram of a visible-light-reflecting coating having a multi-layer thin-film interference filter that may be provided on conductive structures in device 10 (e.g., portions of housing 12 of FIGS. 1 and 2, conductive components 32 of FIG. 2, conductive sidewall 12W of FIG. 3, etc.). As shown in FIG. 3, a visible-light-reflecting coating such as coating 36 may be disposed (e.g., deposited, layered, formed, etc.) on a conductive substrate such as substrate 34. Substrate 34 may be a conductive structure in device 10 such as a conductive portion of housing 12 (FIGS. 1 and 2), a conductive component 32 (FIG. 2) such as a conductive three-dimensional button or crown, or conductive sidewall 12W (FIG. 3). Substrate 35 may be thicker than coating 36. The thickness of substrate 34 may be 0.1 mm to 5 mm, more than 0.3 mm, more than 0.5 mm, between 5 mm and 20 mm, less than 5 mm, less than 2 mm, less than 1.5 mm, or less than 1 mm (as examples). Substrate 34 may include stainless steel, aluminum, titanium, or other metals or alloys. In other suitable arrangements, substrate 34 may be an insulating substrate such as a ceramic substrate, a glass substrate, or substrates formed from other materials.

Coating 36 may include adhesion and transition layers 40 on substrate 34. If desired, coating 36 may include an opaque color layer such as opaque coloring layer 42 on adhesion and transition layers 40. Opaque coloring layer 42 may be omitted from coating 36 if desired. Coating 36 may also include a multi-layer thin-film interference filter such as thin-film interference filter (TFIF) 38 on opaque coloring layer 42. An optional oleophobic coating or other films, coatings, or layers (e.g., layers that do not substantially contribute to the color response of the coating) may be layered over thin-film interference filter 38 if desired. Opaque coloring layer 42 may, for example, have a first lateral surface that directly contacts adhesion and transition layers 40 and may have a second lateral surface opposite the first lateral surface. Thin-film interference filter 38 may, for example, have a third lateral surface that directly contacts the second lateral surface and may have a fourth lateral surface opposite the third lateral surface (e.g., the fourth lateral surface may form an uppermost or outermost layer of coating 36). Thin-film interference filter 38 may include multiple layers (films) stacked on opaque coloring layer 42. In some implementations, thin-film interference filter 38 may include three stacked layers (films). In other implementations, thin-film interference filter 38 may include four stacked layers (films), five stacked layers (films), or six stacked layers (films). This is merely illustrative and, if desired, thin-film interference filter 38 may include other numbers of layers (e.g., more than six layers, two layers, etc.).

The layers of coating 36 may be deposited on substrate 34 using any suitable deposition techniques. Examples of techniques that may be used for depositing the layers in coating 36 include physical vapor deposition (e.g., evaporation and/or sputtering), cathodic arc deposition, chemical vapor deposition, ion plating, laser ablation, etc. For example, coating 36 may be deposited on substrate 34 in a deposition system having deposition equipment (e.g., a cathode). Substrate 34 may be moved (e.g., rotated) within the deposition system while the deposition equipment (e.g., the cathode) deposits the layers of coating 36. If desired, substrate 34 may be moved/rotated dynamically with respect to speed and/or orientation relative to the deposition equipment (e.g., the cathode) during deposition. This may help provide coating 36 with as uniform a thickness as possible across its area, even in scenarios where substrate 34 has a three-dimensional shape (e.g., minimizing the difference in thickness across the lateral area of the coating).

Thin-film interference filter 38 may be formed from a stack of layers of material such as inorganic dielectric layers with different index of refraction values. The thin-film interference filter layers may have higher index of refraction values (sometimes referred to as "high" index values) and lower index of refraction values (sometimes referred to as "low" index values). The high index layers may be interleaved with the low index layers if desired. Incident light may be transmitted through each of the layers in thin-film interference filter 38 while also reflecting off the interfaces between each of the layers, as well as at the interface between the thin-film interference filter and opaque coloring layer 42 (or adhesion and transition layers 40 in implementations where opaque coloring layer 42 is omitted from coating 36) and at the interface between the thin-film interference filter and air. By controlling the thickness and index of refraction (e.g., composition) of each layer in thin-film interference filter 38, the light reflected at each interface may destructively and/or constructively interfere at a selected set of wavelengths such that reflected light that passes out of the thin-film interference filter 38 is perceived by an observer with a desired color and brightness across a corresponding range of viewing angles (angles of incidence, e.g., from 0 to 60 degrees relative to a normal axis of the conductive structure), while also exhibiting a response that is relatively invariant across the lateral area of the coating even when deposited onto an underlying substrate 34 having a three-dimensional (e.g., curved) shape.

Unlike the layers of thin-film interference filter 38, opaque color layer 42 is substantially opaque and does not transmit light incident upon coating 36. On the other hand, opaque color layer 42 may reflect incident light received through thin-film interference filter 38 back towards and through thin-film interference filter 38. The thickness and/or composition of opaque coloring layer 42 may contribute to the color response of the light upon exiting coating 36 as viewed by a user (e.g., in combination with the interference effects imparted to the transmitted and reflected light by thin-film interference filter 38). Opaque color layer 42 may sometimes also be referred to herein as a non-interference filter layer or an intrinsic color layer.

Figure 4:
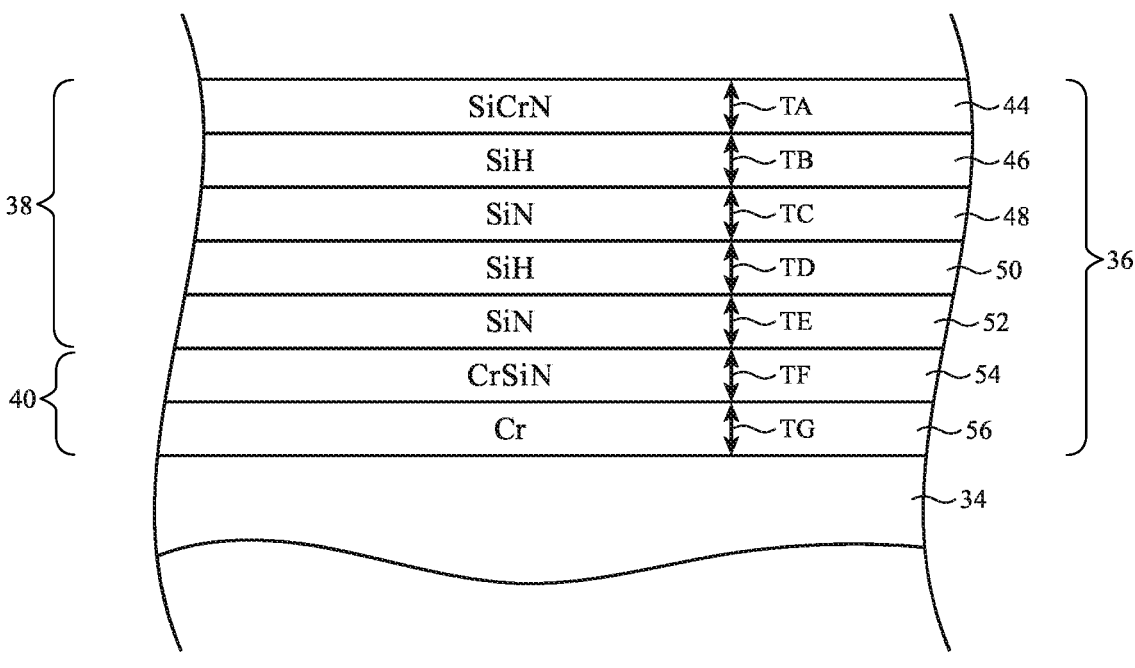
FIG. 4 is a cross-sectional side view of an illustrative visible-light-reflecting coating having a five-layer interference film with an uppermost SiCrN layer and alternating SiH and SiN layers in accordance with some embodiments.

FIG. 4 is a cross-sectional side view showing one illustrative composition for coating 36. In the example of FIG. 4, coating 36 does not include an opaque coloring layer 42. As shown in FIG. 4, adhesion and transition layers 40 may include a seed (adhesion) layer 56 on substrate 34 and one or more transition layers such as transition layer 54 on seed layer 56. Adhesion and transition layers 40 may help to adhere thin-film interference filter 38 to substrate 34, for example. Seed layer 56 may couple substrate 34 to transition layer 54 (e.g., the transition layer may be interposed between the seed layer and thin-film interference filter 38).

Seed layer 56 may be formed from chromium (Cr) whereas transition layer 54 is formed from chromium silicon nitride (CrSiN), in one example. This is merely illustrative. If desired, the seed layer and/or the transition layer(s) described herein may include chromium nitride (CrN), chromium silicon (CrSi), titanium (Ti), chromium silicon nitride (CrSiN), chromium silicon carbonitride (CrSiCN), chromium silicon carbide (CrSiC), chromium carbonitride (CrCN), other metals, metal alloys, and/or other materials.

Seed layer 56 may have a thickness TG. Transition layer 54 may have a thickness TF. Thickness TF may be relatively large (e.g., greater than the thickness of any of the other layers of coating 36 or greater than the thicknesses of all other layers of coating 36 combined). Thickness TF may be, for example, 900-1100 nm, 800-1200 nm, 500-1500 nm, greater than 100 nm, greater than 500 nm, greater than 800 nm, less than 1200 nm, less than 1500 nm, or other thicknesses. Thickness TG of seed layer 56 may also be relatively large but may, in general, be less than thickness TF. Thickness TG may be, if desired, greater than the thickness of any of the other layers of coating 36 except for transition layer 54. Thickness TG may be, for example, 50-150 nm, 80-120 nm, 30-200 nm, greater than 80 nm, greater than 50 nm, less than 120 nm, less than 150 nm, less than 200 nm, or other thicknesses.

In the example of FIG. 4, thin-film interference filter 38 is a five-layer interference filter having five stacked layers (e.g., layers 44-52). As shown in FIG. 4, thin-film interference filter 38 may include a lowermost (bottom) layer 52 that is layered onto transition layer 54. Layer 52 may have thickness TE. Thin-film interference filter 38 may include a second lowermost layer 50 that is layered onto layer 52. Layer 50 may have thickness TD. Thin-film interference filter 38 may include a middle layer 48 that is layered onto layer 50. Layer 48 may have thickness TC. Thin-film interference filter 38 may include a second uppermost layer 46 that is layered onto layer 48. Layer 46 may have thickness TB. Thin-film interference filter 38 may include an uppermost layer 44 that is layered onto layer 46. Layer 44 may have thickness TA.

Layer 44 may include silicon chromium nitride (SiCrN) and may therefore sometimes be referred to herein as SiCrN layer 44. Layer 46 may include silicon hydride (SiH) and may therefore sometimes be referred to herein as SiH layer 46. Layer 48 may include silicon nitride (SiN) and may therefore sometimes be referred to herein as SiN layer 48. Layer 50 may include SiH and may therefore sometimes be referred to herein as SiH layer 50. Layer 52 may be include SiN and may therefore sometimes be referred to herein as SiN layer 52. Put differently, thin-film interference filter 38 may include an uppermost SiCrN layer 44 stacked onto alternating (interleaved) SiH and SiN layers (e.g., SiH layer 46, SiN layer 48, SiH layer 50, and SiN layer 52). The example of FIG. 4 is merely illustrative. The layers of thin-film interference filter 38 may be disposed in other orders and/or may have other compositions. Transition layer 54 may include a higher percentage of Cr than Si atoms, whereas SiCrN layer 44 includes a higher percentage of Si atoms than Cr atoms.

The composition and thicknesses of the layers of thin-film interference filter 38 may be selected so that coating 36 exhibits a robust deep orange or red color across a predetermined range of angles of incidence. The thickness TA of SiCrN layer 44 may, for example, be selected to be 30-40 nm, 20-50 nm, 10-60 nm, 5-40 nm, 30-80 nm, greater than 30 nm, greater than 20 nm, less than 40 nm, less than 50 nm, or other thicknesses. The thickness TB of SiH layer 46 may, for example, be selected to be greater than thickness TA (e.g., 40-50 nm, 30-60 nm, 20-70 nm. 10-50 nm, 40-80 nm, greater than 40 nm, greater than 30 nm, greater than 20 nm, less than 50 nm, less than 80 nm, or other thicknesses). The thickness TC of SiN layer 48 may, for example, be selected to be less than thickness TA and/or thickness TB (e.g., 10-20 nm, 10-30 nm, 5-25 nm, 10-40 nm, 5-30 nm, less than 20 nm, less than 25 nm, less than 30 nm, greater than 10 nm, or other thicknesses). The thickness TD of SiH layer 50 may, for example, be selected to be greater than thickness TA, TB, and/or TC (e.g., 50-60 nm, 40-70 nm, 55-95 nm, 20-120 nm, greater than 50 nm, greater than 40 nm, less than 60 nm, less than 80 nm, less than 100 nm, or other thicknesses). The thickness TE of SiN layer 52 may, for example, be selected to be less than thickness TD and/or greater than thicknesses TA. TB, and/or TC (e.g., 50-60 nm, 40-70 nm, 45-85 nm, 20-100 nm, greater than 50 nm, greater than 40 nm, less than 60 nm, less than 70 nm, or other thicknesses).

When configured in this way, coating 36 may exhibit a deep orange or red color (e.g., may impart substrate 34 with a deep orange or red color). For example, at the location where coating 36 exhibits maximum thickness and at an angle of incidence (viewing angle) of zero degrees (e.g., in the normal direction of the point of maximum thickness), coating 36 may exhibit an L* value (e.g., in a L*a*b* color space or another color space) of 60-70, 60-65, 50-70, 40-80, 30-80, greater than 60, greater than 55, greater than 50, greater than 40, less than 65, less than 70, less than 80, or other values. At this point and viewing angle, coating 36 may exhibit an a* value (e.g., in the L*a*b* color space or another color space) of 20-30, 25-30, 15-35, 10-40, 5-50, greater than 25, greater than 20, greater than 15, greater than 10, less than 30, less than 35, less than 40, less than 50, or other values). In addition, at this point and viewing angle, coating 36 may exhibit an b* value (e.g., in the L*a*b* color space or another color space) of 60-70, 55-65, 50-70, 45-75, 40-80, 30-80, greater than 60, greater than 55, greater than 50, greater than 40, less than 65, less than 70, less than 80, or other values.

Figure 5:
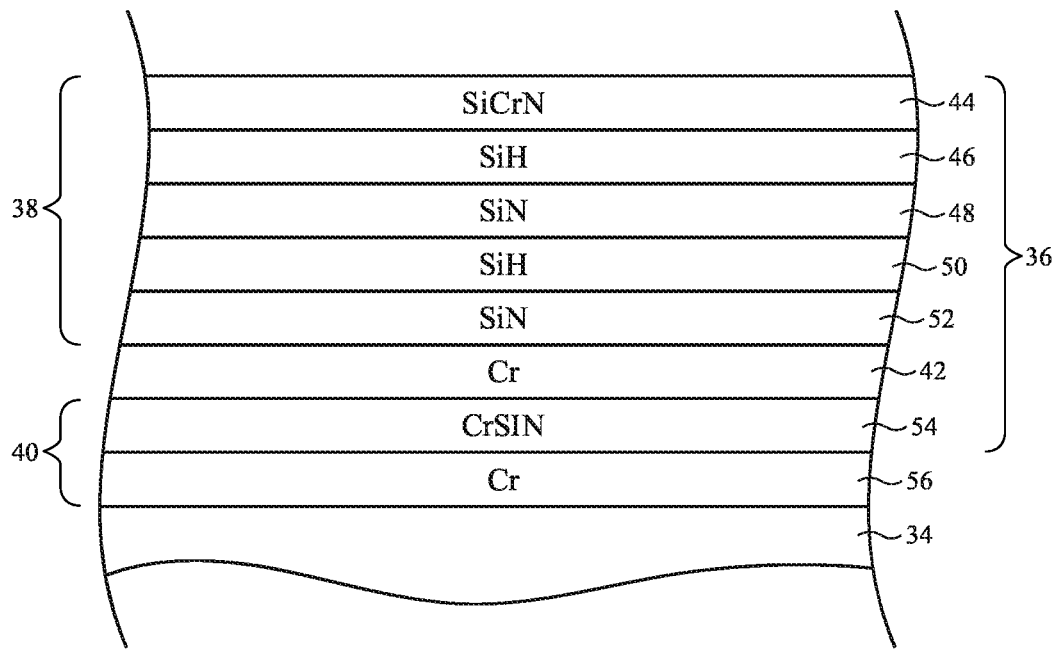
FIG. 5 is a cross-sectional side view of an illustrative visible-light-reflecting coating having a Cr opaque coloring layer and a five-layer interference film with an uppermost SiCrN layer and alternating SiH and SiN layers in accordance with some embodiments.

The example of FIG. 4 in which coating 36 does not include an opaque coloring layer 42 is merely illustrative. If desired, coating 36 may include an opaque coloring layer 42 interposed between thin-film interference filter 38 and transition layer 54, as shown in the example of FIG. 5. As shown in FIG. 5, coating 36 may include opaque coloring layer 42 between thin-film interference filter 38 and adhesion and transition layers 40. Opaque coloring layer 42 of FIG. 5 may include chromium (Cr) and may therefore sometimes be referred to herein as Cr opaque coloring layer 42.

The thickness of Cr opaque coloring layer 42 may, for example, be selected to be greater than the thicknesses of each of the layers of thin-film interference filter 38 (e.g., 70-80 nm, 60-80 nm, 55-90 nm, 70-75 nm, greater than 70 nm, greater than 60 nm, greater than 50 nm, less than 75 nm, less than 80 nm, less than 90 nm, or other thicknesses). In this implementation, the thickness of SiH layer 46 may be less than the thickness of SiCrN layer 44 and the thickness of SiN layer 52 may be greater than the thickness of SiH layer 50 if desired. The thicknesses of SiCrN layer 44, SiN layer 48, SiH layer 50, and/or SiN layer 52 may be greater than the corresponding thicknesses in the implementation of FIG. 4 and/or the thickness of SiH layer 46 may be less than the thickness of SiH layer 46 in the implementation of FIG. 4, if desired. When configured in this way, coating 36 may exhibit a higher L* value, a higher b* value, and/or a lower a* value than in the example of FIG. 4 where opaque coloring layer 42 is omitted.

Figure 6:
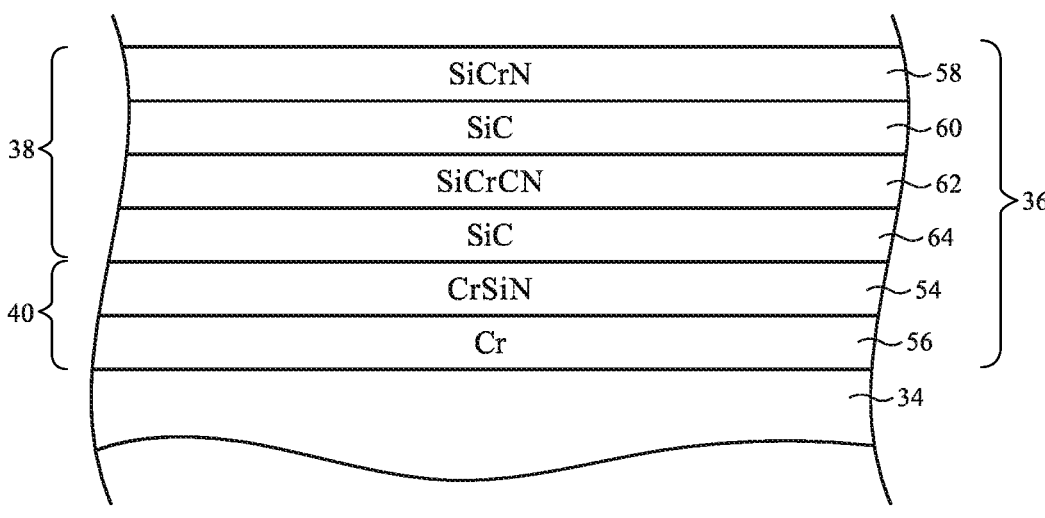
FIG. 6 is a cross-sectional side view of an illustrative visible-light-reflecting coating having a four-layer interference film with an uppermost SiCrN layer and alternating SiCrCN and SiC layers in accordance with some embodiments.

The example of FIGS. 4 and 5 in which thin-film interference filter 38 is a five-layer thin-film interference filter is merely illustrative. If desired, thin-film interference filter 38 may be a four-layer thin-film interference filter, as shown in the example of FIG. 6. In the example of FIG. 6, opaque coloring layer 42 has been omitted from coating 36.

As shown in FIG. 6, thin-film interference filter 38 may include a lowermost (bottom) layer 64 that is layered onto transition layer 54. Thin-film interference filter 38 may include a second lowermost layer 62 that is layered onto layer 64. Thin-film interference filter 38 may include a second uppermost layer 60 that is layered onto layer 62. Thin-film interference filter 38 may include an uppermost (top) layer 58 that is layered onto layer 60.

Layer 58 may include SiCrN and may therefore sometimes be referred to herein as SiCrN layer 58. Layer 60 may include silicon carbide (SiC) and may therefore sometimes be referred to herein as SiC layer 60. Layer 62 may include silicon chromium carbonitride (SiCrCN) and may therefore sometimes be referred to herein as SiCrCN layer 62. Layer 64 may include SiC and may therefore sometimes be referred to herein as SiC layer 64. Put differently, thin-film interference filter 38 may include an uppermost SiCrN layer 58 stacked onto alternating (interleaved) SiC and SiCrCN layers. The example of FIG. 6 is merely illustrative. The layers of thin-film interference filter 38 may be disposed in other orders and/or may have other compositions.

The composition and thicknesses of the layers of thin-film interference filter 38 may be selected so that coating 36 exhibits a robust deep orange or red color across a predetermined range of angles of incidence. The thickness of SiCrN layer 58 may, for example, be selected to be 20-30 nm. 10-40 nm, 20-25 nm, 15-35 nm, 5-30 nm, greater than 20 nm, greater than 10 nm, less than 25 nm, less than 30 nm, less than 50 nm, or other thicknesses. The thickness of SiC layer 60 may, for example, be selected to be greater than the thickness of SiCrN layer 58 (e.g., 30-40 nm, 25-40 nm, 20-35 nm, 15-45 nm, 10-50 nm, greater than 30 nm, greater than 20 nm, less than 35 nm, less than 40 nm, less than 50 nm, or other thicknesses). The thickness of SiCrCN layer 62 may, for example, be selected to be greater than the thickness of SiCrN layer 58 and/or SiC layer 60 (e.g., 80-90 nm, 70-100 nm, 85-95 nm, 60-110 nm, greater than 80 nm, greater than 70 nm, less than 90 nm, less than 100 nm, or other thicknesses). The thickness of SiC layer 64 may, for example, be selected to be greater than the thickness of SiCrN layer 58 and/or SiC layer 60 and/or less than the thickness of SiCrCN layer 62 (e.g., 40-50 nm, 40-45 nm, 35-50 nm, 30-60 nm, 20-70 nm, greater than 40 nm, greater than 35 nm, greater than 30 nm, greater than 20 nm, less than 45 nm, less than 50 nm, less than 60 nm, or other thicknesses).

When configured in this way, coating 36 may exhibit a yellow (e.g., may impart substrate 34 with a yellow color). For example, at the location where coating 36 exhibits maximum thickness and at an angle of incidence (viewing angle) of zero degrees (e.g., in the normal direction of the point of maximum thickness), coating 36 may exhibit an L* value of 80-90, 70-100, 75-95, 60-100, greater than 80, greater than 75, greater than 70, greater than 60, less than 85, less than 90, less than 100, or other values. At this point and viewing angle, coating 36 may exhibit an a* value of −5-5, −2-2, −10-10, −15-15, −5-10, greater than −1, greater than −5, less than 5, less than 10, or other values. In addition, at this point and viewing angle, coating 36 may exhibit an b* value of 60-70, 55-75, 50-80, 40-90, greater than 60, greater than 55, greater than 50, greater than 40, less than 65, less than 70, less than 80, or other values.

Figure 7:
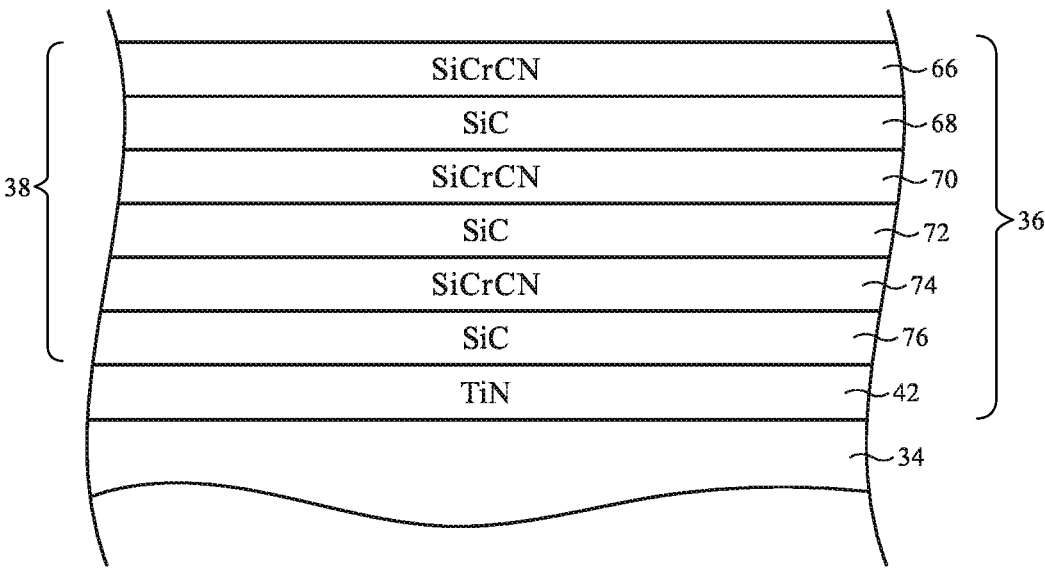
FIG. 7 is a cross-sectional side view of an illustrative visible-light-reflecting coating having a six-layer interference film with an uppermost SiCrCN layer and alternating SiCrCN and SiC layers in accordance with some embodiments.

FIG. 7 is a cross-sectional side view of coating 36 in an example where thin-film interference filter 38 is a six-layer thin-film interference filter and in which coating 36 includes opaque coloring layer 42. Adhesion and transition layers 40 (FIG. 3) are not shown in FIG. 7 for the sake of clarity.

As shown in FIG. 7, coating 36 may include opaque coloring layer 42 between thin-film interference filter 38 and substrate 34. Opaque coloring layer 42 of FIG. 7 may include titanium nitride (TiN) and may therefore sometimes be referred to herein as TiN opaque coloring layer 42. The thickness of TiN opaque coloring layer 42 may, for example, be selected to be greater than the thicknesses of each of the layers of thin-film interference filter 38 (e.g., 200-300 nm, 100-400 nm, 210-230 nm, greater than 200 nm, greater than 100 nm, less than 250 nm, less than 300 nm, or other thicknesses).

Thin-film interference filter 38 may include a lowermost (bottom) layer 76 that is layered onto TiN opaque coloring layer 42. Thin-film interference filter 38 may include a second lowermost layer 74 that is layered onto layer 76. Thin-film interference filter 38 may include a third lower-most layer 72 that is layered onto layer 74. Thin-film interference filter 38 may include a third uppermost layer 70 that is layered onto layer 72. Thin-film interference filter 38 may include a second uppermost layer 68 that is layered onto layer 70. Thin-film interference filter 38 may include an uppermost (top) layer 66 that is layered onto layer 68.

Layer 66 may include SiCrCN and may therefore some-times be referred to herein as SiCrCN layer 66. Layer 68 may include SiC and may therefore sometimes be referred to herein as SiC layer 68. Layer 70 may include SiCrCN and may therefore sometimes be referred to herein as SiCrCN layer 70. Layer 72 may include SiC and may therefore sometimes be referred to herein as SiC layer 72. Layer 74 may include SiCrCN and may therefore sometimes be referred to herein as SiCrCN layer 74. Layer 76 may include SiC and may therefore sometimes be referred to herein as SiC layer 76. Put differently, thin-film interference filter 38 may include alternating (interleaved) SiC and SiCrCN lay-ers, with an uppermost SiCrCN layer 66. The example of FIG. 7 is merely illustrative. The layers of thin-film inter-ference filter 38 may be disposed in other orders and/or may have other compositions.

The composition and thicknesses of the layers of thin-film interference filter 38 may be selected so that coating 36 exhibits a robust deep orange or red color across a prede-termined range of angles of incidence. The thickness of SiCrCN layer 66 may, for example, be selected to be 40-50 nm, 30-60 nm, 20-70 nm, greater than 40 nm, greater than 30 nm, greater than 20 nm, less than 50 nm, less than 60 nm, or other thicknesses. The thickness of SiC layer 68 may, for example, be selected to be greater than the thickness of SiCrCN layer 66 (e.g., 60-70 nm, 60-75 nm. 50-80 nm, 55-90 nm, greater than 60 nm, greater than 50 nm, less than 70 nm, less than 80 nm, or other thicknesses. The thickness of SiCrCN layer 70 may, for example, be selected to be less than the thickness of SiCrCN layer 66 and/or SiC layer 68 (e.g., 30-40 nm, 25-50 nm, 20-60 nm, 10-70 nm, greater than 30 nm, greater than 20 nm, less than 40 nm, less than 50 nm, or other thicknesses). The thickness of SiC layer 72 may, for example, be selected to be less than the thickness of SiCrCN layer 66 and/or SiC layer 68 (e.g., 30-40 nm. 25-50 nm, 20-60 nm, 10-70 nm, greater than 30 nm, greater than 20 nm, less than 40 nm, less than 50 nm, or other thicknesses). The thickness of SiCrCN layer 74 may, for example, be selected to be greater than the thickness of SiCrCN layer 70, SiCrCN layer 66, and/or SiC layer 72 (e.g., 55-65 nm, 50-70 nm, 40-80 nm, greater than 60 nm, greater than 50 nm, greater than 40 nm, less than 65 nm, less than 70 nm, less than 80 nm, or other thicknesses). The thickness of SiC layer 76 may, for example, be selected to be greater than the thick-ness of SiCrCN layer 70, SiCrCN layer 66, and/or SiC layer 72 and/or less than the thickness of SiCrCN layer 74 (e.g., 50-60 nm, 40-65 nm, 30-70 nm, greater than 50 nm, greater than 40 nm, less than 55 nm, less than 60 nm, less than 80 nm, or other thicknesses.

When configured in this way, coating 36 may exhibit a deep orange or red color (e.g., may impart substrate 34 with a deep orange or red color). For example, at the location where coating 36 exhibits maximum thickness and at an angle of incidence (viewing angle) of zero degrees (e.g., in the normal direction of the point of maximum thickness), coating 36 may exhibit an L* value of 50-60, 45-55, 40-65, 30-70, greater than 50, greater than 45, less than 55, less than 60, less than 70, or other values. At this point and viewing angle, coating 36 may exhibit an a* value of 35-45, 30-50, 25-55, 20-60, greater than 35, greater than 30, greater than 20, less than 45, less than 50, less than 60, or other values. In addition, at this point and viewing angle, coating 36 may exhibit an b* value of 40-50, 30-60, 25-70, greater than 40, greater than 30, less than 50, less than 60, or other values.

Figure 8:
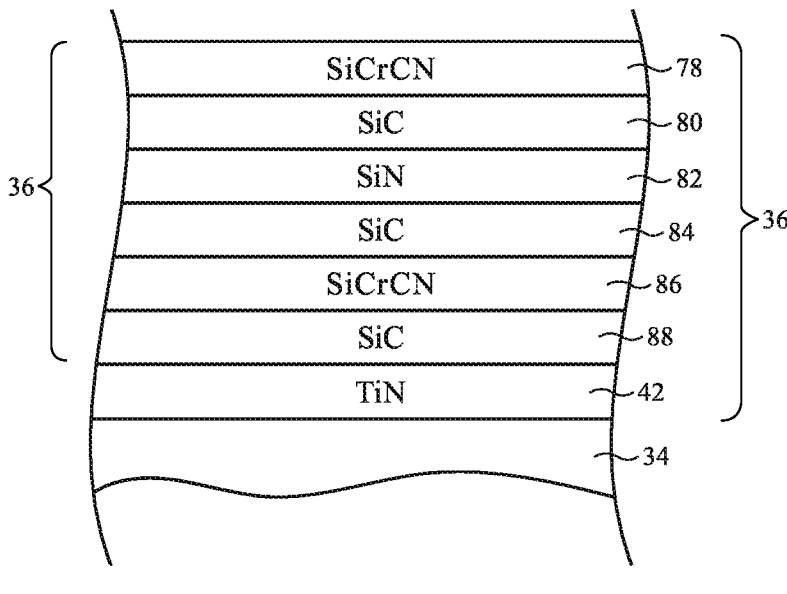
FIG. 8 is a cross-sectional side view of an illustrative visible-light-reflecting coating having a TiN opaque coloring layer and a six-layer interference film with an uppermost SiCrCN layer, SiC, SiN, and SiCrCN layers in accordance with some embodiments.

If desired, SiCrCN layer 70 may be replaced in thin film interference filter 38 with an SiN layer, as shown in the example of FIG. 8. Adhesion and transition layers 40 (FIG. 3) are not shown between TiN opaque coloring layer 42 and substrate 34 in FIG. 8 for the sake of clarity.

As shown in FIG. 8, thin-film interference filter 38 may include a lowermost (bottom) layer 88 (e.g., an SiC layer 88) that is layered onto TiN opaque coloring layer 42. Thin-film interference filter 38 may include a second lowermost layer 86 (e.g., an SiCrCN layer 86) that is layered onto layer 88. Thin-film interference filter 38 may include a third lower-most layer 84 (e.g., an SiC layer 84) that is layered onto layer 86. Thin-film interference filter 38 may include a third uppermost layer 82 that is layered onto layer 84. Layer 82 may include SiN and may therefore sometimes be referred to herein as SiN layer 82. Thin-film interference filter 38 may include a second uppermost layer 80 (e.g., an SiC layer 80) that is layered onto layer 82. Thin-film interference filter 38 may include an uppermost (top) layer 78 (e.g., an SiCrCN layer 78) that is layered onto layer 80. The example of FIG. 8 is merely illustrative. The layers of thin-film interference filter 38 may be disposed in other orders and/or may have other compositions.

The composition and thicknesses of the layers of thin-film interference filter 38 may be selected so that coating 36 exhibits a robust deep orange or red color across a prede-termined range of angles of incidence. The thickness of SiCrCN layer 66 may, for example, be selected to be 60-70 nm. 50-80 nm, 40-90 nm, greater than 60 nm, greater than 50 nm, less than 70 nm, less than 80 nm, or other thick-nesses. The thickness of SiC layer 80 may, for example, be selected to be 50-60 nm, 50-70 nm, 40-80 nm, greater than 50 nm, greater than 40 nm, less than 60 nm, less than 70 nm, or other thicknesses. The thickness of SiN layer 82 may, for example, be selected to be 30-40 nm, 20-50 nm, greater than 30 nm, greater than 20 nm, less than 40 nm, less than 50 nm, or other thicknesses. The thickness of SiC layer 84 may, for example, be selected to be greater than the thicknesses of the other layers of thin-film interference filter 38 (e.g., 100-150 nm, 80-200 nm, 110-130 nm, greater than 100 nm, greater than 110 nm, greater than 80 nm, less than 130 nm, less than 150 nm, or other thicknesses). The thickness of SiCrCN layer 86 may, for example, be selected to be 70-80 nm, 60-80 nm, 50-90 nm, greater than 70 nm, greater than 60 nm, less than 80 nm, less than 90 nm, or other thicknesses. The thickness of SiC layer 88 may, for example, be selected to be 50-60 nm, 40-70 nm, greater than 50 nm, greater than 40 nm, less than 60 nm, less than 70 nm, or other thicknesses.

Figure 9:
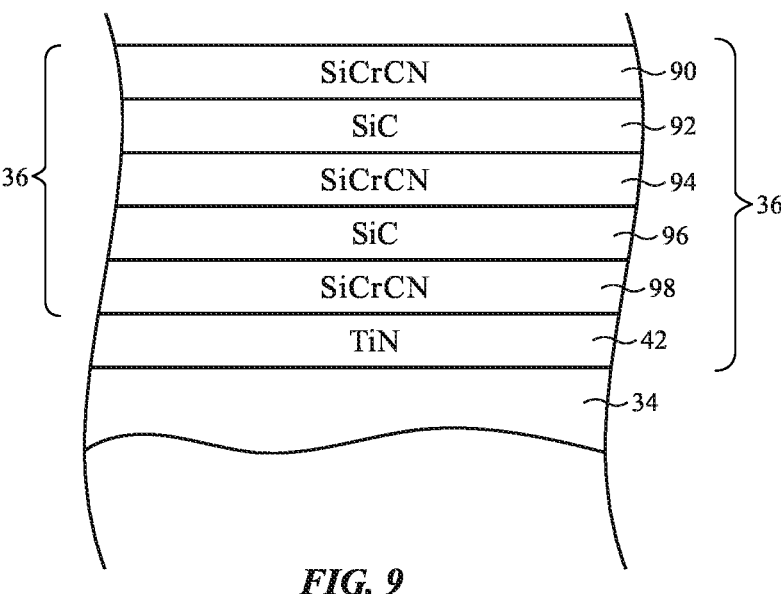
FIG. 9 is a cross-sectional side view of an illustrative visible-light-reflecting coating having a TiN opaque coloring layer and a five-layer interference film with an uppermost SiCrCN layer and alternating SiC and SiCrCN layers in accordance with some embodiments.

FIG. 9 is a cross-sectional side view of coating 36 in an example where thin-film interference filter 38 is a five-layer thin-film interference filter having alternating SiCrCN and SiC layers and in which coating 36 includes opaque coloring layer 42. Adhesion and transition layers 40 (FIG. 3) are not shown in FIG. 9 for the sake of clarity.

As shown in FIG. 9, thin-film interference filter 38 may include a lowermost (bottom) layer 98 (e.g., an SiCrCN layer 98) that is layered onto TiN opaque coloring layer 42. Thin-film interference filter 38 may include a second lowermost layer 96 (e.g., an SiC layer 96) that is layered onto layer 98. Thin-film interference filter 38 may include a middle layer 94 (e.g., an SiCrCN layer 94) that is layered onto layer 96. Thin-film interference filter 38 may include a second uppermost layer 92 (e.g., an SiC layer 92) that is layered onto layer 94. Thin-film interference filter 38 may include an uppermost (top) layer 90 (e.g., an SiCrCN layer 90) that is layered onto layer 82. Put differently, thin-film interference filter 38 may have an uppermost SiCrCN layer 90 stacked onto alternating (interleaved) SiC and SiCrCN layers. The example of FIG. 9 is merely illustrative. The layers of thin-film interference filter 38 may be disposed in other orders and/or may have other compositions.

The composition and thicknesses of the layers of thin-film interference filter 38 may be selected so that coating 36 exhibits a robust deep orange or red color across a predetermined range of angles of incidence. The thickness of SiCrCN layer 90 may, for example, be selected to be 60-70 nm, 50-80 nm, 40-90 nm, greater than 60 nm, greater than 50 nm, less than 70 nm, less than 80 nm, or other thicknesses. The thickness of SiC layer 92 may, for example, be selected to be greater than the thicknesses of the other layers of thin-film interference filter 38 (e.g., 100-150 nm, 80-200 nm, 110-130 nm, greater than 100 nm, greater than 110 nm, greater than 80 nm, less than 130 nm, less than 150 nm, or other thicknesses). The thickness of SiCrCN layer 94 may, for example, be selected to be 60-70 nm, 50-80 nm, greater than 60 nm, greater than 50 nm, less than 70 nm, less than 80 nm, or other thicknesses. The thickness of SiC layer 96 may, for example, be selected to be 20-30 nm, 20-40 nm, 10-50 nm, greater than 20 nm, greater than 10 nm, less than 30 nm, less than 40 nm, less than 50 nm, or other thicknesses. Alternatively, the thickness of SiC layer 96 may be selected to be 100-120 nm, 90-130 nm, greater than 100 nm, greater than 80 nm, less than 120 nm, less than 130 nm, or other thicknesses. The thickness of SiCrCN layer 98 may, for example, be selected to be 35-55 nm, 30-50 nm, 20-60 nm, greater than 40 nm, greater than 30 nm, less than 50 nm, less than 60 nm, or other thicknesses.

FIG. 10 is a cross-sectional side view of coating 36 in another example where thin-film interference filter 38 is a four-layer thin-film interference filter having an uppermost SiCrCN layer and in which coating 36 includes opaque coloring layer 42. Adhesion and transition layers 40 (FIG. 3) are not shown in FIG. 10 for the sake of clarity.

As shown in FIG. 10, thin-film interference filter 38 may include a lowermost (bottom) layer 108 (e.g., an SiH or SiC layer 108) that is layered onto TiN opaque coloring layer 42. Thin-film interference filter 38 may include a second lowermost layer 106 (e.g., an SiN layer 106) that is layered onto layer 108. Thin-film interference filter 38 may include a second uppermost layer 104 (e.g., an SiC layer 104) that is layered onto layer 106. Thin-film interference filter 38 may include an uppermost (top) layer 102 (e.g., an SiCrCN layer 102) that is layered onto layer 104. The example of FIG. 10 is merely illustrative. The layers of thin-film interference filter 38 may be disposed in other orders and/or may have other compositions.

The composition and thicknesses of the layers of thin-film interference filter 38 may be selected so that coating 36 exhibits a robust deep orange or red color across a predetermined range of angles of incidence. The thickness of SiCrCN layer 102 may, for example, be selected to be 60-70 nm, 50-80 nm, 40-90 nm, greater than 60 nm, greater than 50 nm, less than 70 nm, less than 80 nm, or other thicknesses. The thickness of SiC layer 104 may, for example, be selected to be greater than the thicknesses of the other layers of thin-film interference filter 38 (e.g., 100-150 nm, 80-200 nm, 110-130 nm, greater than 100 nm, greater than 110 nm, greater than 80 nm, less than 130 nm, less than 150 nm, or other thicknesses). The thickness of SiN layer 106 may, for example, be selected to be 60-70 nm, 50-80 nm, greater than 60 nm, greater than 50 nm, less than 70 nm, less than 80 nm, or other thicknesses. The thickness of layer 108 may, for example, be selected to be 40-60 nm, 30-70 nm, greater than 40 nm, greater than 30 nm, less than 60 nm, less than 70 nm, or other thicknesses.

FIG. 11 is a cross-sectional side view of coating 36 in another example where thin-film interference filter 38 is a three-layer thin-film interference filter having an uppermost SiCrCN layer and in which coating 36 includes opaque coloring layer 42. Adhesion and transition layers 40 (FIG. 3) are not shown in FIG. 11 for the sake of clarity.

As shown in FIG. 11, thin-film interference filter 38 may include a lowermost (bottom) layer 114 (e.g., a CrSiN or SiCrCN layer 114) that is layered onto TiN opaque coloring layer 42. Thin-film interference filter 38 may include a middle layer 112 (e.g., an SiC layer 112) that is layered onto layer 114. Thin-film interference filter 38 may include an uppermost (top) layer 110 (e.g., an SiCrCN layer 110) that is layered onto layer 112. The example of FIG. 11 is merely illustrative. The layers of thin-film interference filter 38 may be disposed in other orders and/or may have other compositions.

The composition and thicknesses of the layers of thin-film interference filter 38 may be selected so that coating 36 exhibits a robust deep orange or red color across a predetermined range of angles of incidence. The thickness of SiCrCN layer 110 may, for example, be selected to be 30-70 nm, 20-80 nm, greater than 30 nm, greater than 20 nm, less than 70 nm, less than 80 nm, or other thicknesses. The thickness of SiC layer 112 may, for example, be selected to be greater than the thicknesses of the other layers of thin-film interference filter 38 (e.g., 100-150 nm, 80-200 nm, 90-130 nm, greater than 100 nm, greater than 900 nm, greater than 80 nm, less than 120 nm, less than 130 nm, or other thicknesses). The thickness of layer 114 may, for example, be selected to be 30-50 nm, 20-60 nm, greater than 30 nm, greater than 20 nm, less than 50 nm, less than 60 nm, or other thicknesses.

The examples of FIGS. 3-11 are merely illustrative. Additional elements, metals, oxides, or materials may be included in one or more of the layers of coating 36. The layers may be arranged in other orders. The layers may have different thicknesses or compositions. The coating may have other color profiles and angular responses. The layers described herein may sometimes also be referred to as films.

The foregoing is merely illustrative and various modifications can be made to the described embodiments. The foregoing embodiments may be implemented individually or in any combination.

What is claimed is:

1. Apparatus comprising:
a conductive substrate; and
a coating on the conductive substrate and having a color, the coating comprising:
adhesion and transition layers, and
a thin-film interference filter on the adhesion and transition layers, wherein the thin-film interference filter has a lowermost layer that contacts the adhesion and transition layers and an uppermost layer opposite the lowermost layer, the uppermost layer comprises SiCrN, and the lowermost layer comprises SiN, and wherein the coating has, at a point of maximum thickness and a viewing angle of zero degrees, an L* value that is greater than 50, an a* value that is greater than 10, and a b* value that is greater than 40.

2. The apparatus of claim 1, wherein the thin-film interference filter is a five-layer thin-film interference filter.

3. The apparatus of claim 2, the thin-film interference filter further comprising:
a first SiH layer stacked on the lowermost layer;
an SiN layer stacked on the first SiH layer; and
a second SiH layer stacked on the SiN layer, the second SiH layer being interposed between the uppermost layer and the SiN layer.

4. The apparatus of claim 3, wherein the adhesion and transition layers comprise:
a CrSiN layer that contacts the lowermost layer of the thin-film interference filter; and
a Cr layer between the CrSiN layer and the conductive substrate.

5. The apparatus of claim 3, wherein the first SiH layer is thicker than the second SiH layer, the uppermost layer, the SiN layer, and the lowermost layer.

6. The apparatus of claim 3, wherein the uppermost layer has a first thickness between 20 nm and 50 nm, the first SiH layer has a second thickness between 30 nm and 60 nm, and the SiN layer has a third thickness between 10 nm and 30 nm.

7. The apparatus of claim 6, wherein the second SiH layer has a fourth thickness between 40 nm and 70 nm and the lowermost layer has a fifth thickness between 40 nm and 70 nm.

8. The apparatus of claim 1, wherein the apparatus comprises a wristwatch and the conductive substrate comprises a button on the wristwatch.

9. Apparatus comprising:
a conductive substrate; and
a coating on the conductive substrate and having a color, the coating comprising:
adhesion and transition layers,
an opaque layer on the adhesion and transition layers, the opaque layer comprising chromium, and
a thin-film interference filter on the opaque layer, the thin-film interference filter having an uppermost layer comprising SiCrN, a lowermost layer comprising SiC, a first intermediate SiCrN layer on the lowermost layer, a first intermediate SiC layer on the first intermediate SiCrN layer, a second intermediate SiCrN layer on the first intermediate SiC layer, and a second intermediate SiC layer on the second intermediate SiCrN layer.

10. The apparatus of claim 9, wherein the thin-film interference filter is a six-layer interference filter.

11. The apparatus of claim 10, wherein the adhesion and transition layers comprise:
a CrSiN layer that contacts the lowermost layer of the thin-film interference filter; and
a TiN layer between the CrSiN layer and the conductive substrate.

12. The apparatus of claim 9, wherein the coating has, at a point of maximum thickness and a viewing angle of zero degrees, an L* value that is greater than 50, an a* value that is greater than 10, and a b* value that is greater than 40.

13. The apparatus of claim 9, wherein the apparatus comprises a wristwatch and the conductive substrate comprises a button on the wristwatch.

14. An apparatus, comprising:
a conductive substrate; and
a coating on the conductive substrate and having a color, the coating comprising:
adhesion and transition layers, and
a thin-film interference filter on the adhesion and transition layers, wherein the thin-film interference filter has a first SiC layer, a first SiCrCN layer on the first SiC layer, and a second SiC layer on the first SiCrCN layer, an SiCrN layer on the second SiC layer, the SiCrN layer forming an uppermost layer of the thin-film interference filter, and the first SiC layer forming a lowermost layer of the thin-film interference filter.

15. The apparatus of claim 14, wherein the coating includes an opaque layer between the first SiC layer and the adhesion and transition layers, the opaque layer comprising titanium nitride.

16. The apparatus of claim 14, wherein the adhesion and transition layers comprise:
a CrSiN layer that contacts the first SiC layer; and
a Cr layer interposed between the CrSiN layer and the conductive substrate.

* * * * *